F. J. HAMMAN.
LAWN EDGER.
APPLICATION FILED JUNE 11, 1917.

1,249,385.

Patented Dec. 11, 1917.

WITNESSES
E. C. Wells
H. L. Opsahl.

INVENTOR
Frank J. Hamman
BY HIS ATTORNEYS

F. J. HAMMAN.
LAWN EDGER.
APPLICATION FILED JUNE 11, 1917.
1,249,385.
Patented Dec. 11, 1917.
2 SHEETS—SHEET 2.
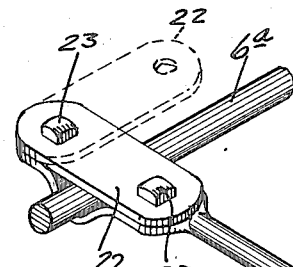
Fig.3
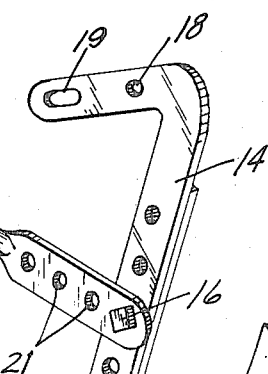
Fig.4
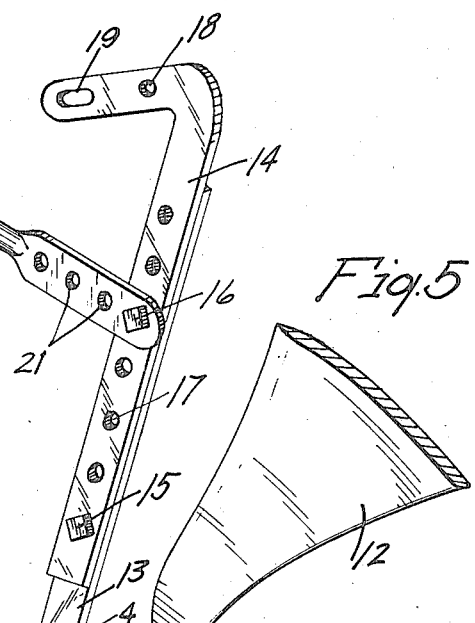
Fig.5
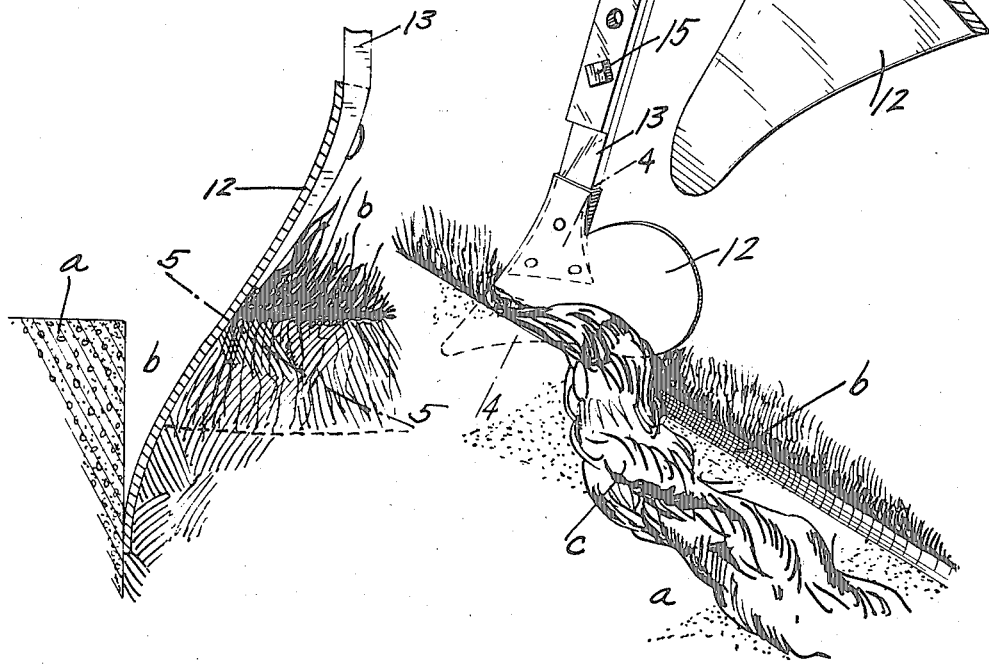
WITNESSES
E. E. Wells
H. L. Opsahl.
INVENTOR
Frank J. Hamman
BY HIS ATTORNEYS
Williamson Merchant

UNITED STATES PATENT OFFICE.

FRANK J. HAMMAN, OF MINNEAPOLIS, MINNESOTA, ASSIGNOR OF ONE-HALF TO LEONARD J. SCHMITT, OF MINNEAPOLIS, MINNESOTA.

LAWN-EDGER.

1,249,385.  Specification of Letters Patent.  Patented Dec. 11, 1917.

Application filed June 11, 1917. Serial No. 174,016.

*To all whom it may concern:*

Be it known that I, FRANK J. HAMMAN, a citizen of the United States, residing at Minneapolis, in the county of Hennepin and State of Minnesota, have invented certain new and useful Improvements in Lawn-Edgers; and I do hereby declare the following to be a full, clear, and exact description of the invention, such as will enable others skilled in the art to which it appertains to make and use the same.

My invention has for its object to provide an improved lawn edger in the nature of an attachment to a lawn mower, and by which arrangement the lawn mower may be used to cut the grass simultaneously with the use of the edger to trim the edge of a lawn along a sidewalk or elsewhere.

In the accompanying drawings which illustrate the preferred form of the lawn edging attachment, like characters indicate like parts throughout the several views.

Referring to the drawings,

Fig. 3 is a perspective view of the edger attachment;

Fig. 4 is a detail in vertical section taken approximately on the line 4—4 of Fig. 3; and Fig. 5 is a horizontal section taken on the line 5—5 of Fig. 4.

Figure 1:
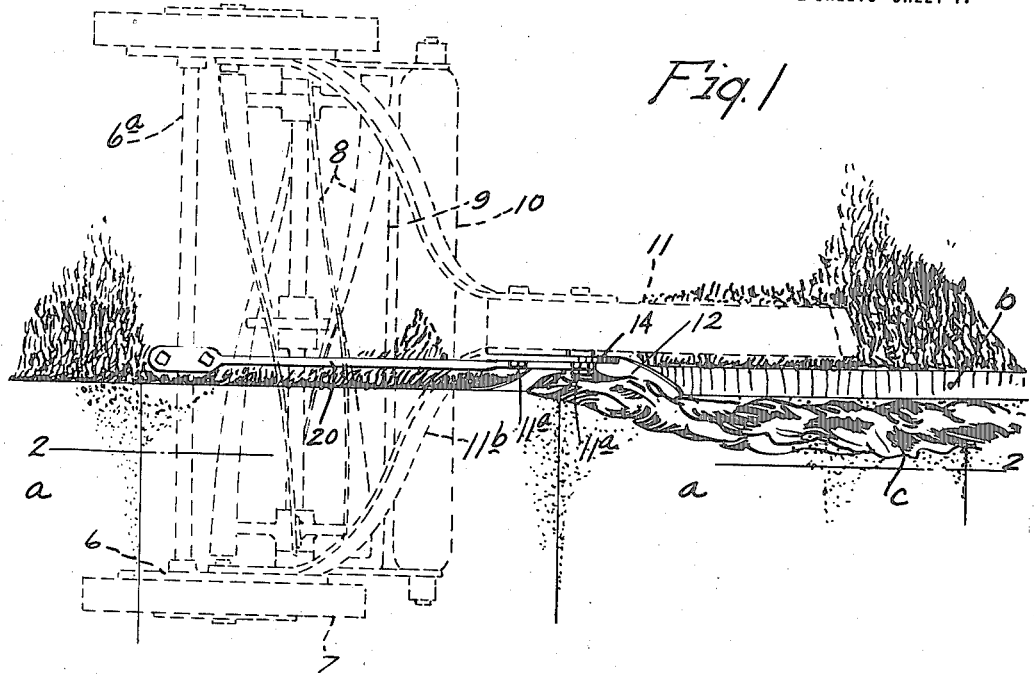
Figure 1 is a plan view showing the lawn mower in dotted lines and showing the attachment in full plan view.
Figure 2:
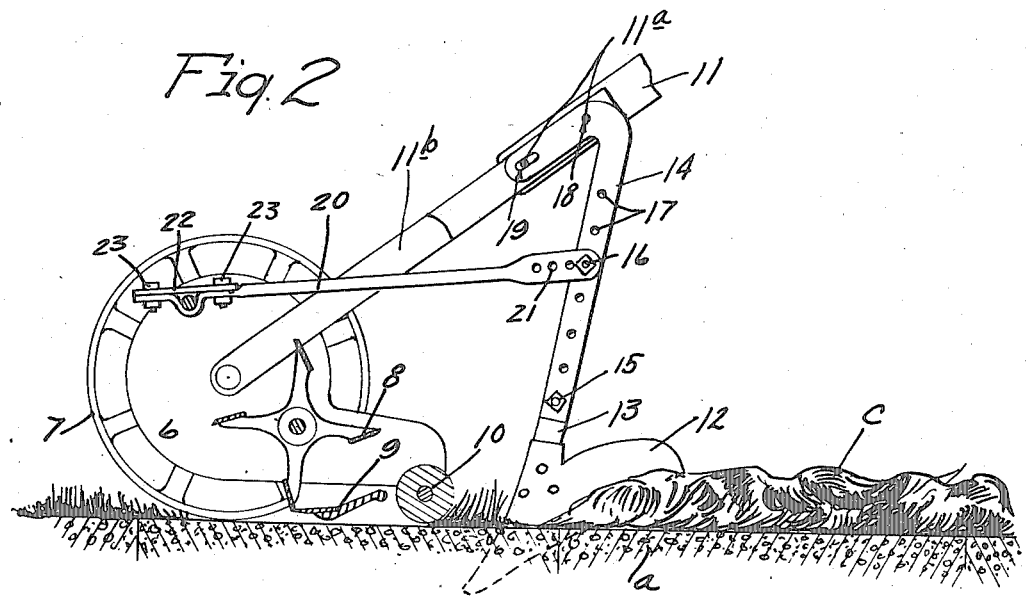
Fig. 2 is a vertical section taken through the lawn mower approximately on the line 2—2 of Fig. 1.

Of the parts of the lawn mower, it is only desirable for the purposes of this case to particularly note the mower frame 6, including a transverse front tie bar 6ª, wheels 7, rotary cutter 8, fixed cutter blade 9, rear gage roller 10 and push bar 11. My improved attachment includes a plow blade or mold board 12 preferably made of tempered steel and rigidly secured to the lower end of a plow beam or bar, which, as preferably constructed, is made up of two members 13 and 14, overlapped and rigidly but adjustably connected by short nut-equipped bolts 15 and 16 that work through perforations 17 in the said bars 13 and 14. The upper end of the bar 14 is forwardly turned and provided with perforations 18 and 19, the latter of which, as shown, is elongated. These perforations 18 and 19 adapt the plow beam, at its upper end, to be rigidly, but detachably secured to the push bar 11, by means of the customary nut-equipped bolts 11ª that are used to connect said bar to its metal fork straps 11ᵇ.

To reinforce the connection between the so-called plow beam or bar and the lawn mower, I provide a so-called link 20 that forms a connection between the tie bar 6ª and the intermediate portion of said plow beam. This link 20, at its rear end, is shown as flattened and provided with longitudinally spaced perforations 21, through any one of which and any of the alined perforations 17 of the plow bar, the bolt 16 is adapted to be inserted and pivotally connected to said parts. At its front end, the link 20 is flattened and bent to fit the rod 6ª and is provided with a clamping plate 22 held thereto by short nut-equipped bolts 23. When one of the bolts 23 is removed, the plate 22 can be turned into the position shown by dotted lines in Fig. 3, and thereby permit the link 20 to be detached from the bar 6ª. Here it may be noted that the entire attachment can be removed from the lawn mower simply by removing one of the bolts 23 and removing the nuts of the two bolts 11ª.

When the device is attached, as shown in the drawings, the point of the plow blade 12 will work just behind the intermediate portion of the roller 10. The depth of cut of the plow can be varied by adjustments of the beam forming bars 13 and 14, one upon the other, and the forward and rearward position of the plow may be varied by adjustments of the bolts 16 in the holes 21.

The plow blade or mold board 12 is tapered toward its lower end and is transversely curved so that its lower end is adapted to engage, for example, against one edge of a concrete walk *a*, and when forced forward, will cut a groove *b*, and to turn a sod furrow *c* over onto the walk, as clearly shown in the drawing. The intermediate portion of the cutter 8, which is just ahead of the plow blade, will cut the grass down to a short length before the plow blade is brought into action on the sod, and this materially reduces the amount of work that has to be done by the plow blade or mold board. Of course, the front edge of the plow blade or mold board 12 should be ground or made sharp.

The lawn mower affords an exceedingly good support for the edger. In the first place, it gives a firm support therefor, and in the second place, good power is available for pushing the same. The roller 10 acts as a gage roller to limit the depth of cut of the plow blade. The efficiency of the device has been demonstrated in practice. Obviously, the attachment can be quickly applied to a lawn mower and quickly and easily removed therefrom.

What I claim is:

1. The combination with a lawn mower having a rearwardly extended push bar and a transverse tie bar, of an edger comprising a plow beam secured to said push bar, a plow blade applied to the lower end of said plow beam and arranged to work immediately at the rear of said mower, and a link connecting the intermediate portion of said plow beam to the said tie bar.

2. The combination with a lawn mower having a rearwardly extended push bar and a transverse tie bar, of an edger comprising a plow beam secured to said push bar, a plow blade applied to the lower end of said plow beam and arranged to work immediately at the rear of said mower, and a link connecting the intermediate portion of said plow beam to the said tie bar, the said plow beam being vertically adjustable.

3. The combination with a lawn mower having a rearwardly extended push bar and a transverse tie bar, of an edger comprising a plow beam secured to said push bar, a plow blade applied to the lower end of said plow beam and arranged to work immediately at the rear of said mower, a link connecting the intermediate portion of said plow beam to the said tie bar, the said plow beam being vertically adjustable, and the connection between said link and plow beam being also adjustable.

4. The combination with a lawn mower having a rearwardly extended push bar and a transverse tie rod, of a plow beam made up of overlapped longitudinally adjustable metal straps, the upper end of one of said straps being detachably connected to said push bar, a plow blade secured to the lower end of the other of said straps and working at the rear of said mower, and a link adjustably connected at its rear end to the intermediate portion of said plow beam and provided at its front end with means whereby it may be readily clamped to and disconnected from the intermediate portion of said tie rod.

5. The combination with a lawn mower having a transverse tie bar and a rearwardly extended push bar, which latter has metal fork straps and bolts connecting the same thereto, of an edger comprising a plow beam secured at its upper end by the same bolts that connect said push bar and its fork straps, a plow secured to the lower end of said beam, and a link connected to the intermediate portion of said plow beam and to said tie rod.

In testimony whereof I affix my signature in presence of two witnesses.

FRANK J. HAMMAN.

Witnesses:
  FRANK UETZ,
  GEO. S. MOWERY.